Jan. 31, 1950     E. M. SORENSEN     2,495,783
LOAD BALANCING SYSTEM
Filed Dec. 18, 1947     2 Sheets-Sheet 1

INVENTOR.
EDWARD M. SORENSEN, DECEASED,
BY HELEN S. SORENSEN, Adm.
BY Percy P. Lantry
ATTORNEY Jan. 31, 1950   E. M. SORENSEN   2,495,783
LOAD BALANCING SYSTEM
Filed Dec. 18, 1947
2 Sheets-Sheet 2

INVENTOR.
EDWARD M. SORENSEN, DECEASED,
BY HELEN S. SORENSEN, Adm.
BY
Percy P. Lantz
ATTORNEY Patented Jan. 31, 1950

2,495,783

UNITED STATES PATENT OFFICE 2,495,783

LOAD BALANCING SYSTEM

Edward M. Sorensen, deceased, late of Stamford, Conn., by Helen S. Sorensen, administratrix, Stamford, Conn., assignor to Federal Telephone and Radio Corporation, New York, N. Y., a corporation of Delaware Application December 18, 1947, Serial No. 792,479

2 Claims. (Cl. 171—119)

1

This invention relates to electrical load-balancing systems adapted to maintain an equal load on current supplying apparatus connected in parallel, and is particularly suitable for use with two alternator-transformer rectifier units provided with voltage regulators and connected to the same load. The invention is applicable to electrical supply systems for aircraft in which alternators driven from separate motors are each connected through a transformer rectifier regulator system to the same direct current circuit. It has been found that in apparatus of this type there is a tendency for one unit to assume more of the load than the other, a condition that may result in placing substantially all of the load on that unit.

The general purpose of the invention is to provide a system suitable for automatically maintaining equal loads on both supply systems. An object is to provide an automatic load-balancing unit adapted to correct unbalanced load conditions by automatically adjusting a voltage regulator, and a feature thereof is the provision of a unit of this type that can be readily applied to voltage regulators. A specific purpose is to make the required adjustment of the voltage regulator by changing the value of a variable impedance therein when the load is unbalanced, thereby changing the output voltage from the voltage source to which the regulator is coupled. The resulting change in voltage is appropriate for increasing the load on the less loaded source, and is automatically terminated by restoring said impedance to its normal value when the sources are equally loaded.

Another object of the invention is the provision of a simple, compact and light automatic balancing system of the indicated type. The arrangement is especially suitable for the use of electric metal rectifier units, which have the requisite size and lightness.

Other objects and advantages will appear from the following description, considered in conjunction with the accompanying drawings, in which.

Figure 1:
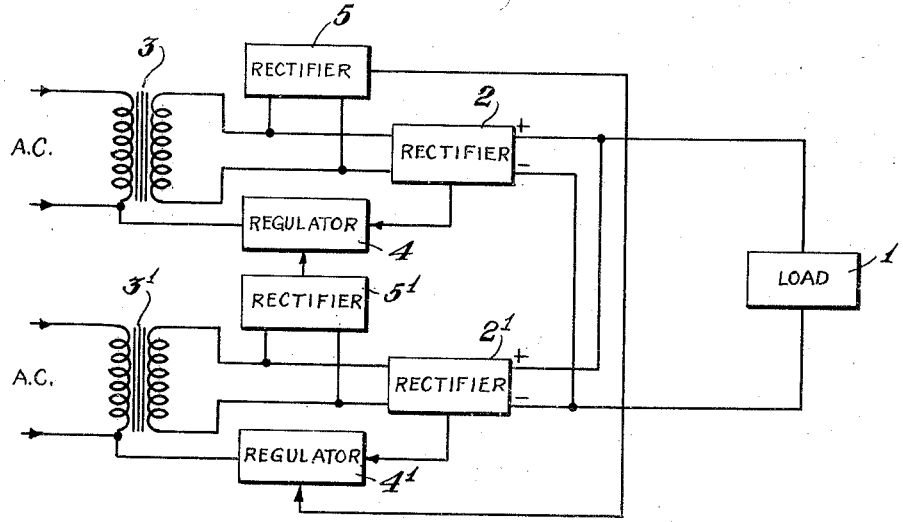
Figure 1 illustrates in block form the basic arrangement of a proposed load-balancing system.

Fundamentally, the proposed arrangement for load-balancing may be represented by the disclosure of Figure 1, in which a load 1 is common to a pair of paralleled rectifiers 2 and 2', each in turn receiving power from separate A.-C. transformers 3 and 3' respectively. Coupled with rectifier 2 is a regulator 4, and with rectifier 2' another regulator 4'. These two combinations of the rectifiers and regulators provide means for adjusting the A.-C. voltage applied to the rectifiers such that output to the load is substantially constant and such that the outputs of both rectifiers are substantially equal. Additional rectifiers, 5 and 5', which do not see the actual load, are coupled with the A.-C. inputs of rectifiers 2 and 2' respectively and also with regulators 4' and 4 respectively. These rectifiers 5 and 5' are utilized to maintain a load balance when unbalance conditions arise. In the event that one of rectifiers 2 and 2' has more load than the other, there will be a difference in potential at the outputs of transformers 3 and 3'. The interconnections of rectifier 5 with regulator 4' and rectifier 5' with regulator 4 impress the rectified transformer output voltages upon these regulators in series with the voltages from the regulators 2 and 2' such that the regulators may change the transformer primary voltages until the load is shared equally by the last-named rectifiers.

Figure 2:
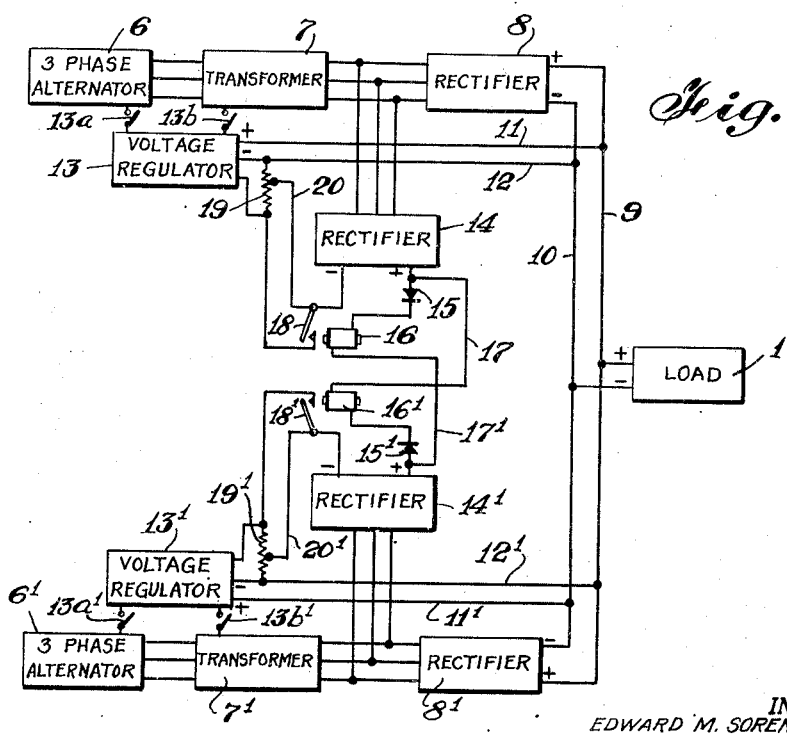
Fig. 2 is a partially block and schematic diagram of one preferred embodiment constructed in accordance with the present invention.

Referring to Figure 2, the invention is illustrated as applied to alternating current generating units provided with suitable transformers and rectifiers, the direct current outputs being connected in parallel to the common load 1. The upper unit comprises a three phase alternator 6, connected to transformer 7 whose output passes through rectifier 8, the direct current output of which is connected to load 1 through positive conductor 9 and negative conductor 10. Conductors 9 and 10 are connected through leads 11 and 12 to voltage regulator 13, which is actuated by variations in the potential difference between the latter leads. The lower unit is of similar type, and the corresponding parts are indicated by the same numerals with primes.

Regulator 13 may be selected from various types. It may be of the type which changes the transformer ratio in the transformer unit 7, systems of this type being illustrated in the pending application Ser. No. 499,034, filed August 18, 1943. The regulator may likewise be of the type that varies the voltage of the output of alternator 6. Various types of regulators acting on the alternator circuit are known, including the carbon pile, vibrator and others. Voltage regulators of these types include generally a resistance whose value determines the normal alternator output voltage; and a change in the value of such resistance will produce a corresponding change in the normal voltage. The regulator may include an inductance which performs a similar function, and the normal voltage may be changed by varying the value of the inductance. Connections either to transformers 7 and 7' or alternators 6 and 6' are represented by the switch connections 13a, 13b and 13a' and 13b', Fig. 2.

The present invention is adapted to correct an unbalanced load by changing the value of such resistance or inductance; and this is conveniently accomplished by short-circuiting a portion thereof having a value suitable for producing the requisite shift in the normal voltage.

In the illustrated arrangement this is accomplished by connecting a balancing rectifier 14 to the output of transformer 7. The positive lead from rectifier 14 is connected to the positive side of blocking rectifier element 15, the negative side being connected to the winding of relay 16, the other terminal of which is connected through lead 17' to the positive output side of the lower balancing rectifier 14', connected to the output of transformer 7'. The positive output of balancing rectifier 14' is connected to the positive side of blocking rectifier element 15', the negative side being connected to the winding of relay 16', the other side of which connects through lead 17 to the positive side of the output from balancing rectifier 14.

The normally open armature 18 of relay 16 is connected to the negative output of balancing rectifier 14 and to the voltage regulator 13. The voltage regulator 13 includes a resistor 19, whose function is described above, one end of the resistor being negative and ordinarily connected to the lead 12. Armature 18 is connected through lead 20 to a point on resistor 19 adjacent said negative end, the arrangement being such that when armature 18 is closed, a portion at the positive end of the resistor 19 will be short-circuited thereby lowering the value of said resistor. A similar arrangement is connected to relay 16' and voltage regulator 13', and is indicated by the same numerals with primes.

When the described system is in normal operation with equal loads on both generators 6 and 6', the voltage drop across the outputs of transformer 7 and the balancing rectifier 14 will be the same as that across the outputs of transformer 7' and balancing rectifier 14'. Consequently there will be no potential difference between the positive terminals of said balancing rectifiers, and no current will flow between said terminals. Under these conditions relays 16 and 16' will remain open and the voltage regulators 13 and 13' will operate in normal manner.

If, however, the load tends to shift to generator 6, the greater current flow through transformer 7 will create a greater drop in potential across the output terminals of the transformer and those of balancing rectifier 14, while the lowered current flow in the output of transformer 7' will reduce the potential drop across the output terminals of balancing rectifier 14'. Under these circumstances the positive terminal of rectifier 14' will be negative with respect to the positive terminal of rectifier 14, and current will flow through rectifier element 15' and relay 16', it being prevented from flowing through relay 16 by blocking rectifier element 15. Armature 18' will close, reducing the value of resistor 19' and causing regulator 13' to increase the output voltage of generator 6'. This will of course tend to take part of the load from generator 6. As soon as the load on the latter generator has reached a point where the current flow in the output of transformer 7 is substantially the same as that in the output of transformer 7', the potential difference between the positive terminals of balancing rectifiers 14 and 14' will disappear, causing armature 18' to open and restoring the resistor 19' to its normal value.

A similar operation occurs when a predominant portion of the load is shifted to generator 6', in which case current will flow through rectifier element 15 and relay 16, increasing the output voltage of generator 6 until the loads are balanced. The provision of the oppositely directed blocking rectifier elements 15 and 15' in the parallel circuits between the positive terminals of balancing rectifiers 14 and 14' is effective in selectively actuating the voltage adjusting apparatus, consisting of relays 16, 16' and their connections, to produce the desired load shifting change in the proper direction.

Figure 3:
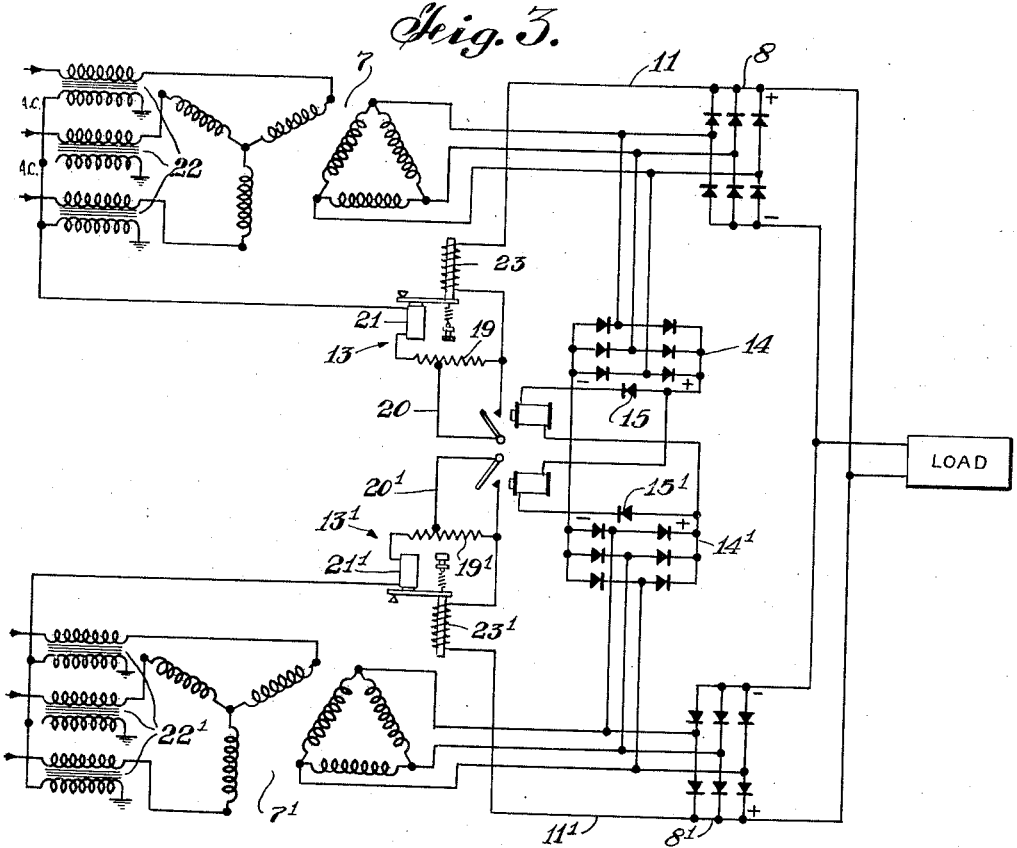
Fig. 3 is a circuit diagram of one form of the arrangement shown in Fig. 2.

One specific embodiment of this arrangement is disclosed in Fig. 3 and is in general self-explanatory. The rectifiers 8, 8', 14, 14' are of the usual three phase full wave type, and are particularly suitable for the use of selenium rectifiers. The voltage regulator 13 is of the carbon pile type in which a carbon pile resistor 21, in series with saturable core reactors 22 in the primary leads of transformer 7, is varied in accordance with current changes in the carbon-compressing solenoid 23, connected to positive lead 11, the resistor 19 also being in series therewith. While the carbon pile 21 is shown in series with the reactors 22, and various features of the usual carbon pile voltage control constructions have been omitted, this has been done for the sake of clarity, since such arrangements are standard and well known. The same regulator arrangement is shown in connection with generator 6' and is indicated by similar numerals with primes.

Figure 4:
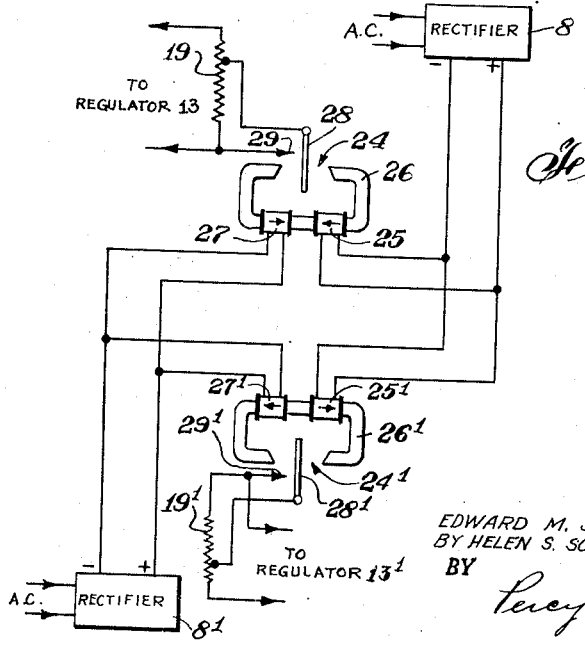
Fig. 4 shows a portion of an embodiment of this invention utilizing polarized relays.

An alternative arrangement whereby the necessity for utilizing the small rectifiers 15 and 15' is eliminated appears in Figure 4 which is a partial showing of the system of Figure 2. The outputs of each of the rectifiers 8 and 8' are connected to a pair of relay coils, one of the pair being associated with one of the two polarized relays generally designated by numerals 24 and 24'. Coupled to rectifier 8 are the relay coil 25 on core 26 of polarized relay 24, and relay coil 25' on core 26' of relay 24'. Similarly, coupled to rectifier 8' are relay coils 27 and 27' on cores 26 and 26' respectively. Should any voltage unbalance occur in the voltage output of the rectifiers 8 and 8', the coils on both of the relay cores will produce unbalanced magnetic effects and cause the relay armature 28 and 28' to be attracted to certain positions. For example, when the output of rectifier 8' is the greater, currents flowing in relay coils 27 and 27' will exceed those flowing in 25 and 25', creating a magnetic unbalance in cores 26 and 26' which is sufficient to close armature 28 with contact 29, thus shorting out a portion of resistance 19, and insuring that relay armature 28' will not be attracted to close with contact 29'. The reverse action occurs when the output voltage of rectifier 8 is larger than that of rectifier 8'. Regulator operation in these instances is the same as previously described with regard to the other embodiments.

Although the embodiments herein described are of the type which increase the output voltage of whichever rectifier contributes the smaller part of the load current, it may be desirable in certain applications to achieve the reverse, that is, reduce the output of the other rectifier until the rectifier having the lesser output voltage assumes its proper share of the load. To accomplish this, an arrangement opposite to those shown might be employed wherein the relay excitations open normally closed relay switches to insert higher impedances into the regulator circuits.

It will be apparent that the disclosed balancing arrangement is adapted for construction as a very light and compact unit, using selenium rectifiers having only a sufficient output to operate the relays, which may be small and simple in type. The balancing system can be applied to voltage regulators of the various types indicated simply by connecting it to the proper transformer and rectifier leads, and connecting leads 20, 20' to appropriate points on the impedances 19, 19'. The control may be made sufficiently sensitive without danger of excessive hunting action by providing relays which have a suitable difference between the voltage at which they close and that at which they open.

It is claimed:

1. An electrical load-balancing system for parallel current supply sources, each source including a source of alternating current and a rectifier for said current, the rectifiers being arranged for connection in parallel to a common load comprising means for regulating the voltage of the alternating current from said source, a control rectifier connected across the alternating current output from each source, and means connected in series between the control rectifiers, responsive to differences in the potentials of the outputs of said control rectifiers due to unbalanced loads, for actuating the regulating means to eliminate said differences in potential, said actuating means comprising relay means and switch means actuated by the relay means when energized to change the adjustment of the regulating means.

2. A load-balancing system as set forth in claim 1 in which the actuating means comprises two relays connected in parallel between similar output terminals of the control rectifiers, a rectifier element in series with each relay, said elements being connected in opposite senses so that current flowing between the control rectifiers in either direction will pass through only one relay, and switch means associated with each relay, actuated when said relay is energized, for changing the adjustment of the voltage regulating means and thereby eliminating potential differences between the control rectifiers.

HELEN S. SORENSEN,
*Administratrix of the Estate of Edward M. Sorensen, Deceased.*

REFERENCES CITED

The following references are of record in the file of this patent:

UNITED STATES PATENTS

| Number | Name | Date |
|---|---|---|
| 2,000,189 | Power | May 7, 1935 |
| 2,092,891 | Overbeck | Sept. 4, 1937 |